Oct. 25, 1966 C. E. STROUD 3,281,298
MANUFACTURE OF MULTIPLE GLAZING UNITS
Filed Oct. 15, 1963 2 Sheets-Sheet 1

INVENTOR.
CHARLES E. STROUD
BY
Oscar L Spencer
ATTORNEY

Oct. 25, 1966   C. E. STROUD   3,281,298
MANUFACTURE OF MULTIPLE GLAZING UNITS
Filed Oct. 15, 1963

INVENTOR.
CHARLES E. STROUD
BY
Oscarh Spencer
ATTORNEY

United States Patent Office 3,281,298
Patented Oct. 25, 1966

3,281,298
MANUFACTURE OF MULTIPLE GLAZING UNITS
Charles E. Stroud, Natrona Heights, Pa., assignor to Pittsburgh Plate Glass Company, Pittsburgh, Pa., a corporation of Pennsylvania
Filed Oct. 15, 1963, Ser. No. 316,351
1 Claim. (Cl. 156—109)

This invention relates to an improved method of manufacturing multiple glazing units.

Multiple glazing units comprise two or more sheets of glass spaced one from the other by a suitable marginal edge spacing element to provide an insulating air chamber between adjacent sheets. In units of the type herein contemplated, a hermetic seal is provided between the edges of the glass sheet and the spacing element by a caulking compound or mastic composition applied in a continuous film between the edges of the sheet and the spacing element to provide a seal and, if desired, to permanently adhere the spaced glass sheets to the spacing element. Mastic compositions such as carbon black dispersed in polyisobutylene may be used, in which case a metal channel member of U-shaped cross section is then affixed over the edges of the assembled unit to apply a clamping pressure thereto about the marginal edges. Alternatively, adhesive type sealing compounds may be used, such as polysulfide based curable synthetic polymers. A unit of the type above-described is disclosed in U.S. Patent No. 2,838,810.

Multiple glazing units of the type above-described have conventionally been fabricated individually. This is time consuming, and requires considerable handling of materials, particularly a large number of glass sheets, resulting in high labor costs. In additon, the fabrication of individual units of small dimensions, for example, oven door windows, is difficult with presently existing conveying and washing equipment designed for processing larger units. The spacing of conveyor rolls and the construction of the automatic washing machines used in the fabricating process will not handle the individual small sheets used for units of small dimensions. On the other hand, orders for such small units are insufficient to justify a capital investment for separate processing lines to handle these sizes.

In accordance with the present invention, there is provided a method by which multiple glazing units of any size may be fabricated more economically and by which small units may be fabricated with presently existing conventional equipment otherwise incapable of handling small size glass sheets.

Briefly, the improved process involves forming a plurality of smaller units from a unitary larger assembly, preferably larger by even multiples of the dimensions of the smaller units. Thus, the fabrication and processing is accomplished while working with large sheets of glass and, thereafter, the larger assembly is severed into smaller double glazing units of the sizes desired.

In accordance with this invention an integral composite assembly is formed of two relatively large, precut, washed and inspected glass sheets. Each glass sheet is identically scored on one surface to delimit smaller rectangular areas corresponding in size with the desired size of the multiple glazing units to be produced. A plurality of spacing elements of sizes corresponding to the smaller rectangular areas are fabricated, coated with a mastic sealing composition, and then placed upon the scored surface of one of the larger, precut, glass sheets so that each spacing element fits just within one of the smaller rectangular areas delimited by the marginal edges of the larger sheet and the score line or lines subdividing the sheet. The second, large, precut glass sheet is placed upon the spacing elements, scored side up, and in superposed relationship with the first glass sheet. The glass sheets of the composite assembly are then severed along the score line or lines to form assembled smaller units, each spaced about its periphery by a marginal spacing element.

This invention may be better understood from the following detailed description and with reference to the accompanying drawings in which.

Figure 1:
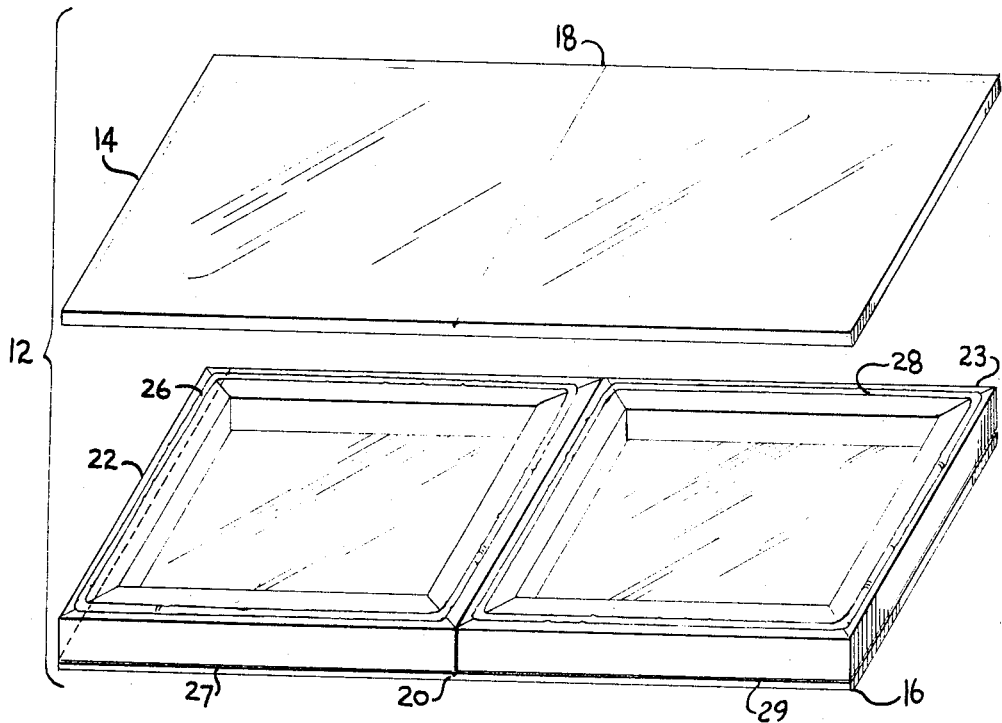
FIG. 1 is a perspective view of the elements that form a composite assembly, shown partly in expanded form to reveal the marginal spacing elements and sealing mastic as they appear prior to the placement of the top sheet of glass.
Figure 2:
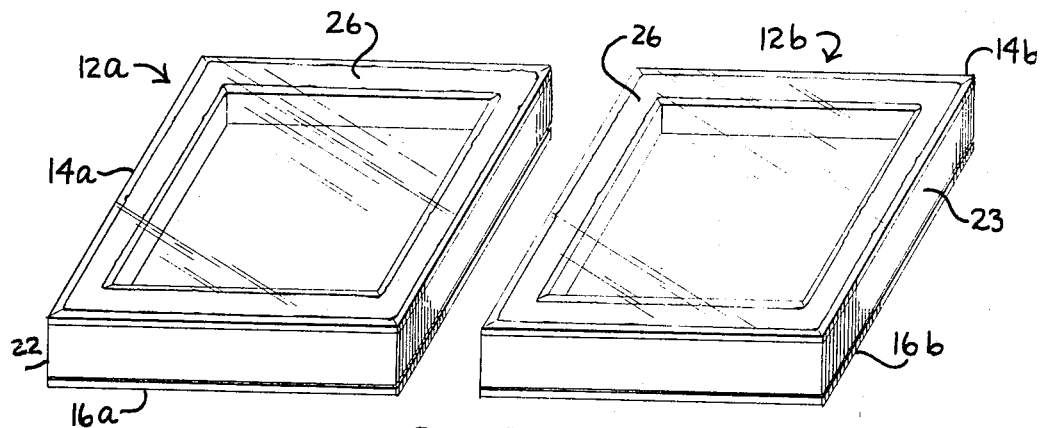
FIG. 2 is a perspective view of two multiple glazing units severed from a composite assembly of the construction shown in FIG. 1.

Referring now to the drawings, there is shown in FIG. 1 an integral composite assembly 12 during the process of fabrication. The composite assembly 12 includes an upper glass sheet 14 and a lower glass sheet 16 of the same size and shape and each precut to twice the size of the desired finished units, indicated generally at 12a and 12b in FIG. 2. Glass sheet 14 is scored on its upper surface along a line 18. The score line 18 divides the glass sheet 14 into two portions corresponding in size to the size of the desired finished units 12a and 12b. Lower glass sheet 16 is scored on its upper surface along a line 20 that corresponds in location with the line 18 of the upper glass sheet 14.

Two fabricated, rectangular-shaped, spacing elements 22 and 23 are of widths equal to the width of the glass sheets 14 and 16 and are of lengths corresponding to the divided lengths of sheets 14 and 16 formed by score lines 18 and 20. In the embodiment shown in FIG. 1 score lines 18 and 20 divide glass sheets 14 and 16, respectively, into two equal areas and spacing elements 22 and 23 are of identical size and shape. The smaller units 12a and 12b formed therefrom will therefore be of equal size. It will be readily apparent, however, that units of unequal size may be also formed in this manner.

To form the assembly of FIG. 1, spacing elements 22 and 23 are placed in abutting relationship to each other upon the lower glass sheet 16, each within the confines of an area delimited by the marginal edges of glass sheets 16 and score line 20. Layers 26 and 27 of a mastic composition are on the opposite sides of spacing element 22 that are adapted to contact inner, facing surfaces of glass sheets 14 and 16, and mastic layers 28 and 29 are on opposite side surfaces of spacing element 23. These mastic layers provide a seal for the finished units and, at least for handling purposes during fabrication, adhere spacing elements 22 and 23 to glass sheets 14 and 16. The upper glass sheet 14 is placed upon spacing elements 22 and 23 in superposed relationship with lower glass sheet 16 to complete the composite assembly 12. It will be readily apparent that the fabrication of the composite assembly 12 requires only the additional handling of one spacing element as compared with the assembling of a single multiple glazing unit.

The composite unit 12 may be readily separated into the two double glazing units 12a and 12b by substantially simultaneously severing glass sheets 14 and 16 along score lines 18 and 20. It has been found that this may be accomplished in the manner conventionally used to sever a single glass sheet along a single score line. For example, a workman may readily separate the composite unit 12 by cracking off one smaller unit from the composite assembly. Alternatively, the composite unit 12 may be severed by conveying the unit with the scored surfaces of glass sheets 14 and 16 oriented in an upward direction, across a high lift roll that places the scored surfaces of glass sheets 14 and 16 in tension when score lines 18 and 20 are above the roll. Such a procedure is well known in the cutting of single sheets of glass.

Figure 3:
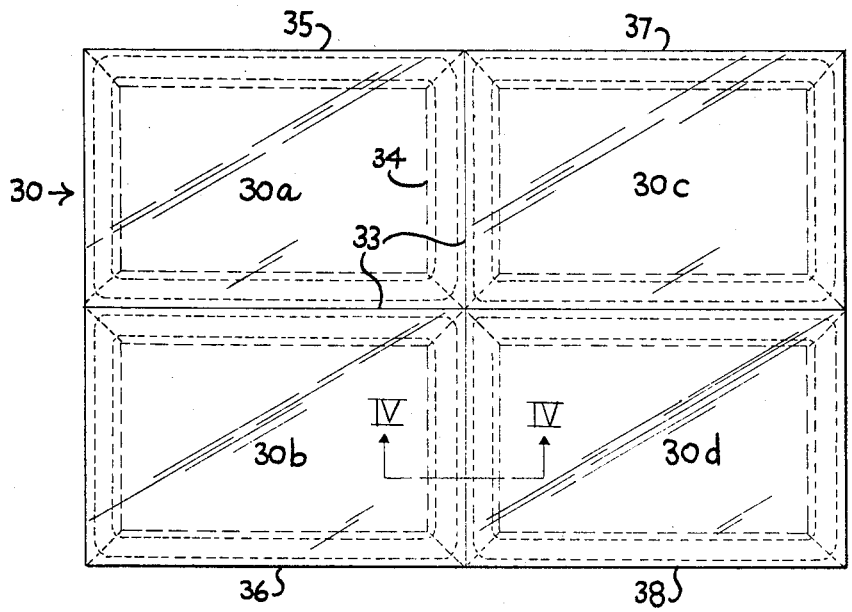
FIG. 3 is a top plan view of a composite unitary assembly of two large sheets of glass and four smaller spacing elements.
Figure 4:
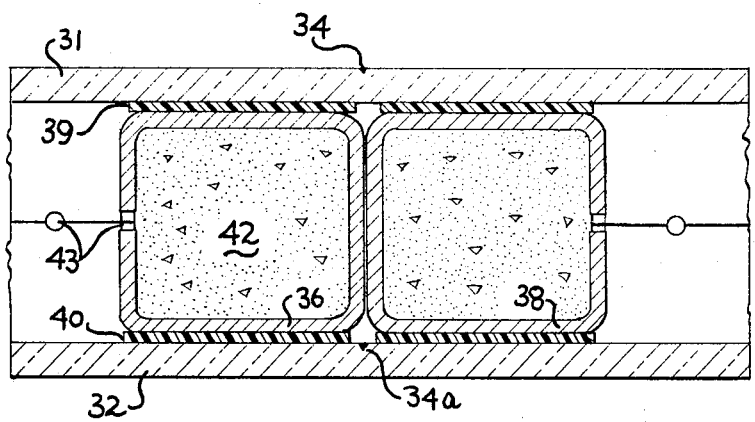
FIG. 4 is a fragmentary sectional view taken along the lines IV—IV of FIG. 3.

There is shown in FIGS. 3 and 4 an embodiment of an integral, composite assembly 30 similar to the assembly 12 shown in FIG. 1 but illustrating the manner in which a greater number of individual multiple glazing units 30a, 30b, 30c and 30d may be arranged into a large composite assembly for convenience in fabrication and handling. Intersecting score lines are formed on corresponding surfaces of two sheets of glass 31 and 32 to divide the sheets into four, equal, rectangular-shaped areas. One set of intersecting score lines 33 and 34 is shown in sheet 31 in FIG. 3. Score line 34 on sheet 31 and a corresponding score line 34a on sheet 32 are also shown in cross section in FIG. 4. Four spacing elements 35, 36, 37 and 38 are spaced, one within each rectangular-shaped area, between the two sheets of glass 31 and 32 in the same manner as previously described in connection with the embodiment of FIG. 1.

Layers of mastic are provided between all spacing elements and the glass sheets, in the manner shown at 39 and 40 with respect to spacing element 36 and glass sheets 31 and 32. A desiccant 42, within the spacing elements and accessible through openings 43 dries the air within the units.

It will be understood that the process herein disclosed may be used for manufacturing multiple glazing units using more than two sheets of glass, e.g., three or more, each separated from the next adjacent sheet by a spacing element. Furthermore, spacing elements of a construction different from that herein disclosed may be used. It is not intended that such details described herein shall be regarded as limitations upon the scope of the invention except insofar as included in the accompanying claim.

I claim:

A method of forming multiple glazing units that comprises scoring a plurality of rectangular-shaped sheets of glass of identical size and shape along corresponding paths on the upper surface thereof to divide said sheets into a plurality of smaller rectangular shapes; placing, on one of said plurality of sheets, a plurality of rectangular-shaped, tubular spacing elements corresponding in number and size to said smaller rectangular shapes and coinciding therewith, and including a mastic composition on two opposite surfaces thereof adapted to contact opposed surfaces of two sheets of said unit; placing a second of said plurality of sheets upon said spacing elements in superposed relationship with said first one of said sheets and with the smaller rectangular shapes corresponding in number and size and coinciding with said spacing elements, and with the scored surface in the same relative orientation and in alignment with the scored surface of said first one of said sheets; and thereafter substantially simultaneously severing along the scored lines on said first and second sheets of glass to form a plurality of units of two spaced sheets of glass separated by tubular spacing elements with the mastic composition between the glass sheets and spacing elements.

References Cited by the Examiner
UNITED STATES PATENTS

| | | | |
|---|---|---|---|
| 1,751,051 | 3/1930 | Nobbe | 156—101 |
| 1,985,520 | 12/1934 | Schafer | 156—101 |

ALEXANDER WYMAN, *Primary Examiner.*

W. J. VAN BALEN, *Assistant Examiner.*